United States Patent
Kaneko et al.

(12) 
(10) Patent No.: US 6,417,291 B1
(45) Date of Patent: Jul. 9, 2002

(54) PROCESS FOR PRODUCING POLYARYLATE

(75) Inventors: Hiroaki Kaneko; Wataru Funakoshi; Yuichi Kageyama; Katsushi Sasaki, all of Yamaguchi (JP)

(73) Assignee: Teijin Limited, Osaka (JP)

( * ) Notice: Subject to any disclaimer, the term of this patent is extended or adjusted under 35 U.S.C. 154(b) by 0 days.

(21) Appl. No.: 09/719,984

(22) PCT Filed: Apr. 7, 2000

(86) PCT No.: PCT/JP00/02282

§ 371 (c)(1),
(2), (4) Date: Dec. 19, 2000

(87) PCT Pub. No.: WO00/63274

PCT Pub. Date: Oct. 26, 2000

(30) Foreign Application Priority Data

Apr. 20, 1999 (JP) .......................................... 11-112481

(51) Int. Cl.$^7$ .............................................. C08F 20/00
(52) U.S. Cl. ........................ 525/437; 528/173; 528/179
(58) Field of Search ................................. 525/437, 439; 528/173, 179, 196

(56) References Cited

U.S. PATENT DOCUMENTS 4,680,372 A   7/1987   Rosenfeld ................... 528/171
4,886,875 A   12/1989  Gay et al. ................... 525/439

FOREIGN PATENT DOCUMENTS

EP          764673          3/1987

OTHER PUBLICATIONS

Patent Abstracts of Japan, JPA 4–288324.
Patent Abstacts of Japan, JPA 4–222821.
Patent Abstracts of Japan, JPA 3–064317.
Patent Abstracts of Japan, JPA 10–36497

*Primary Examiner*—Paul J. Killos
*Assistant Examiner*—Taylor V. Oh
(74) *Attorney, Agent, or Firm*—Sughrue Mion, PLLC

(57) ABSTRACT

In a process for producing a polyarylate through the polycondensation of an aromatic dihydroxy compound and an aromatic ester bond forming precursor, a salicylic acid ester compound having a specific structure is used as a terminal modifying agent.

In a process for producing a polyarylate through the polycondensation of an aromatic dihydroxy compound and an ester bond forming aromatic dicarboxylic acid derivative, a polyarylate of high-molecular weight having excellent color tone and hue stability is obtained.

3 Claims, No Drawings

PROCESS FOR PRODUCING POLYARYLATE

TECHNICAL FIELD

The present invention relates to a process for producing a polyarylate. More specifically, the present invention relates to a process for producing a polyarylate of high-molecular weight having excellent color tone and hue stability by modifying a part or the whole part of the terminal carboxylic groups and the terminal hydroxyl groups existing at terminals of polymer chains with a specific salicylic acid ester compound.

A polyarylate is one of the engineering plastics, and it is used in various fields recently due to that it is excellent in mechanical properties and moldability, and further in properties such as chemical resistance, impact resistance and electric properties.

As processes for producing such polyarylates, many processes including an interfacial (solution) method in which a halide of an aromatic dicarboxylic acid is made to react with an aromatic dihydroxy compound in the presence of a basic compound, a method (melt-polycondensation method) in which a diaryl ester of an aromatic dicarboxylic acid and an aromatic dihydroxy compound are polymerized with each other by removing a phenolic compound (aromatic monohydroxy compound) and a method (melt-polycondensation method) in which a polymer is formed from a molten mixture of an aromatic dicarboxylic acid, an aromatic dihydroxy compound and a diaryl carbonate by removing a phenolic compound (aromatic monohydroxy compound) are known.

Among them, the method (melt-polycondensation method) in which a polymer is formed from a molten mixture of an aromatic dicarboxylic acid, an aromatic dihydroxy compound and a diaryl carbonate by removing a phenolic compound has the possibility of less expensive production since it needs to use no solvent, and a diphenyl carbonate which is a raw material for aromatic polycarbonate production or the like can be used as the diaryl carbonate of the raw material of this method, and thus the method is considered to be promising in future.

BACKGROUND ART

However, a polyarylate polymerization through a melt-polycondensation method has commonly a trouble that the melt viscosity of a polymer characteristically becomes extremely higher than that of another polycondensation polymer, for example, such as polyethylene terephthalate or aromatic polycarbonate with increasing of a polymerization degree, and thereby it is necessary to carry out a special operation, for example, polymerization with an elevated temperature (by reducing viscosity), and as a result, coloring of the polymer occurs.

It has been known that on the coloring during molten state, terminal groups of a polymer has a strong influence. For example, JP-A 4-288324 (JP-A, means Japanese unexamined patent application) has described that coloring is prevented by reducing the amount of phenolic terminal groups of a polyarylate. JP-A 4-222821 discloses a process for producing a polycarbonate useful for molding, by decreasing the concentrations of terminal carboxyl groups and phenolic terminal hydroxyl groups. Further, JP-A 3-64317 discloses a method for controlling the terminal groups by controlling mole balances of raw materials during melt polycondensation.

Also regarding methods using a specific compound as a terminal blocking agent, some investigations have been carried out. For example, JP-A 2-238020 has described a method for reducing the amount of terminal carboxylic acid groups by using an agent selected from the group consisting of diphenyl carbonate, unsubstituted polyaryl carbonate oligomers, unsubstituted polyaryl carbonate polymers, substituted polyaryl carbonate oligomers and substituted polyaryl carbonate polymers. JP-B 6-99548 (JP-B means Japanese examined patent application) discloses a process for producing a polyarylate whose terminal group has been converted to a benzoate group using phenyl benzoate.

Further, JP-A 10-36497 discloses a process for producing a polycarbonate having excellent hue and an increased polymerization degree by using a specific salicylic acid ester derivative when a polycarbonate is produced by a molten method.

However, presently, a truly useful method for preventing coloring has not been proposed yet for polyarylates.

The object of the present invention is to obtain a polyarylate having excellent color tone and hue stability in a process for producing a polycarbonate through the polycondensation of an aromatic dihydroxy compound and an aromatic ester bond forming precursor.

According to the present invention, a modified polyarylate of high-molecular weight, having excellent color tone and hue stability can be produced by modifying a part or the whole part of the terminal carboxylic groups and/or hydroxy groups quickly and sufficiently with a terminal modifying agent by melt polycondensation.

Further, needless to say, in the present invention, "a process for producing a polyarylate through the polycondensation of an aromatic dihydroxy compound and an aromatic ester bond forming precursor" includes the above-mentioned methods, that is, the method (melt-polycondensation method) in which a diaryl ester of an aromatic dicarboxylic acid and an aromatic dihydroxy compound are polymerized with each other by removing a phenolic compound (aromatic monohydroxy compound) and the method (melt-polycondensation method) in which a polymer is formed from a molten mixture of an aromatic dicarboxylic acid, an aromatic dihydroxy compound and a diaryl carbonate by removing a phenolic compound (aromatic monohydroxy compound).

DISCLOSURE OF THE INVENTION

The inventors of the present invention found that hue stability during molten state is improved by blocking polymer terminal groups such as carboxyl groups and hydroxyl groups, which affect strong influences on coloring during molten state, using a salicylic acid ester compound having a specific structure as a terminal modifying agent in a process for producing a polyarylate through the polycondensation of an aromatic dihydroxy compound and an aromatic ester bond forming precursor, and further, that a polyarylate having a high polymerization degree and at the same time excellent in color tone can be obtained by allowing polymer terminal groups to couple to each other through a specific structural part of the salicylic acid ester compound to convert the polymer to the one having higher degree of polymerization in a short time. In addition, in the latter case, the polyarylate has a reduced amount of the polymer terminal groups such as carboxyl groups and hydroxyl groups, which affect strong influences on coloring during molten state, owing to the coupling, and also has an improved hue stability during molten state.

That is, the present invention comprises the following.

1. A process for producing a polyarylate through the polycondensation of an aromatic dihydroxy compound and an aromatic ester bond forming precursor, characterized in that terminal modification reaction is carried out by using a salicylic acid ester compound expressed by the following formula (1) as a terminal modifying agent,

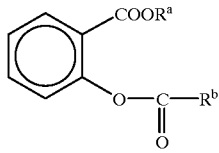

(1)

[wherein $R^a$ is ethyl or methyl; $R^b$ is a $C_{1 \text{ to } 30}$ alkyl group (hereinafter, $C_{x \text{ to } y}$ means x to y of carbon number), a $C_{1 \text{ to } 30}$ alkoxy group, a $C_{6 \text{ to } 30}$ aryl group or a $C_{6 \text{ to } 30}$ aryloxy group; $R^b$ is optionally substituted with methoxycarbonyl, ethoxycarbonyl, 2-(methoxycarbonyl)phenyloxycarbonyl, 2-(methoxycarbonyl)phenyloxycarbonyloxy, 2-(ethoxycarbonyl)phenyloxycarbonyl, 2-(ethoxycarbonyl)phenyloxycarbonyloxy, a $C_{1 \text{ to } 30}$ alkyl group, a $C_{6 \text{ to } 30}$ aryl group or a $C_{6 \text{ to } 30}$ aralkyl group].

2. A process for producing a polyarylate described in the description 1, characterized in that a catalyst is used in the polycondensation and/or the terminal modification reaction, and the catalyst is at least one compound selected from the group consisting of all combinations of alkali metal compounds, nitrogen-containing basic compounds, and compounds of a metal element of the group 3, 14 or 15 of the periodic table.

3. A process for producing a polyarylate described in the description 2, characterized in that the nitrogen-containing basic compound includes a compound expressed by the following formula (2),

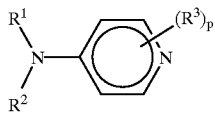

(2)

[wherein $R^1$, $R^2$ and $R^3$ are all same to or different from each other, and H or a $C_{1 \text{ to } 30}$ alkyl group; p is an integer of 1 to 4].

Here, in the description 1, "as the terminal modifying agent, a salicylic acid ester compound is used" means that a salicylic acid ester compound and a terminal group of a polyarylate are made to react with each other to perform "terminal modification" in the below-mentioned meaning.

The compound expressed by the above formula (1) becomes a carbonate or a carboxylic acid ester depending the definition of $R^b$.

That is, when $R^b$ is a $C_{1 \text{ to } 30}$ alkyl group or a $C_{6 \text{ to } 30}$ aryl group, the compound becomes an ester compound, and when $R^b$ is a $C_{1 \text{ to } 30}$ alkoxy group or a $C_{6 \text{ to } 30}$ aryloxy group, the compound becomes a salicylic acid ester compound containing a carbonate bond.

Herein, the $C_{1 \text{ to } 30}$ alkyl group may be linear, branched or cyclic, or may contain an unsaturated group. Examples of the alkyl group include linear alkyl groups such as methyl, ethyl, n-propyl, n-butyl, n-pentyl, n-hexyl, n-octyl, n-nonyl, n-lauryl, n-stearyl, n-docosanyl, and n-heptacosanyl, branched alkyl groups such as isopropyl, t-butyl, 3-hexyldecanyl and 6-butyltetracosanyl, unsaturated alkyl groups such as allyl, butenyl, pentenyl, hexenyl, dodecenyl, oleyl and 6-docosenyl, and cyclic alkyl groups such as cyclohexyl, 4-nonylcyclohexyl, 4-pentenylcyclohexyl and norbornene.

Further, the $C_{1 \text{ to } 30}$ alkyloxy group may be linear, branched or cyclic, or may contain an unsaturated group. The examples of the alkoxyl group contain linear alkoxy groups such as methoxy, ethoxy, n-propoxy, n-butoxy, n-hexyloxy, n-octyloxy, n-nonyloxy, n-stearyloxy, n-docosanyloxy and n-hexacosanyloxy, branched alkoxy groups such as isopropyloxy and 3-hexyldodecanyloxy, unsaturated alkoxy groups such as allyloxy, butenyloxy, pentenyloxy, hexenyloxy and dodecenyloxy, and cyclic alkyloxy groups such as cyclohexyloxy.

Further, the examples of the $C_{6 \text{ to } 30}$ aryl group include phenyl, naphthyl, anthranil, biphenyl and pyrenyl.

Further, examples of the $C_{6 \text{ to } 30}$ aryloxy group include phenyloxy, naphthyloxy, anthraniloxy, biphenyloxy and pyrenyloxy.

The above-mentioned alkyl groups, alkoxy groups, aryl groups and aryloxy groups may be substituted with methoxycarbonyl, ethoxycarbonyl, 2-(methoxycarbonyl)phenyloxycarbonyl, 2-(methoxycarbonyl)phenyloxycarbonyloxy 2-(ethoxycarbonyl)phenyloxycarbonyl, 2-(ethoxycarbonyl)phenyloxycarbonyloxy, a $C_{1 \text{ to } 30}$ alkyl, a $C_{3 \text{ to } 30}$ aryl or a $C_{6 \text{ to } 30}$ aralkyl.

Concrete examples of a $C_{1 \text{ to } 30}$ alkyl group and a $C_{6 \text{ to } 30}$ aryl group as the substituent also include the above-mentioned compounds. Concrete examples of the $C_{6 \text{ to } 30}$ aralkyl group include benzyl, 3-phenyl-n-propyl, phenylisopropyl ($-C(CH_3)_2-C_6H_5$) and the like.

Concrete examples of the salicylic acid ester compound to be used in the present invention include 2-methyloxycarbonylphenyl methyl carbonate, 2-methyloxycarbonylphenyl n-butyl carbonate, 2-methyloxycarbonylphenyl n-hexyl carbonate, 2-ethyloxycarbonylphenyl n-nonyl carbonate, 2-methyloxycarbonylphenyl n-stearyl carbonate, 2-methyloxycarbonylphenyl n-octacosanyl carbonate, 2-methyloxycarbonylphenyl phenyl carbonate, 2-ethyloxycarbonylphenyl phenyl carbonate, 2-methyloxycarbonylphenyl p-t-butylphenyl carbonate, 2-ethyloxycarbonylphenyl p-t-butylphenyl carbonate, 2-methyloxycarbonylphenyl naphthyl carbonate, 2-ethyloxycarbonylphenyl biphenyl carbonate, 2-methyloxycarbonylphenyl pyrenyl carbonate, 2-methyloxycarbonylphenyl p-cumylphenyl carbonate, 2-ethyloxycarbonylphenyl p-cumylphenyl carbonate, bis(2-methyloxycarbonylphenyl) carbonate, 2-methyloxycarbonylphenyl acetate, 2-methyloxycarbonylphenyl n-butyrate, 2-methyloxycarbonylphenyl n-hexylate, 2-ethyloxycarbonylphenyl n-nonylate, 2-methyloxycarbonylphenyl n-stearic acid ester, terephthalic acid bis(2-methyloxycarbonylphenyl) ester, isophthalic acid bis(2-methyloxycarbonylphenyl) ester, terephthalic acid bis(2-ethyloxycarbonylphenyl) ester, isophthalic acid bis(2-ethyloxycarbonylphenyl) ester, succinic acid bis(2-methyloxycarbonylphenyl) ester, adipic acid bis(2-ethyloxycarbonylphenyl) ester, 1,4-butanediolbis(2-ethyloxycarbonylphenyl) carbonate and 1,10-decanediolbis(2-ethyloxycarbonylphenyl) carbonate.

Regarding the amount of impurities in a salicylic acid ester compound, it is preferably little. Especially, regarding chlorine, a heavy metal or the like, it is preferably little when the activity of a reaction with a polymer and influence on polymer quality are taken into consideration.

Concretely, it is preferred that the content of chlorine is 100 ppm or less, and contents of heavy metals are each 1 ppm or less. For reducing the impurities, one can use a method specifically described in the specification of WO98/45246.

In the same way, it is preferred that the content of a compound having a hydroxyl group such as free methyl salicylate or phenyl in the salicylic acid ester compound is little.

There is no special limitation in the synthetic method of the above-mentioned salicylic acid ester compound for carrying out the present invention. As a process for producing the derivative, for example, one can use a method described in the specification of WO98/45246.

As the aromatic dihydroxy compound to be used in the polyarylate polymerization, a compound expressed by the following formula (4) is preferred.

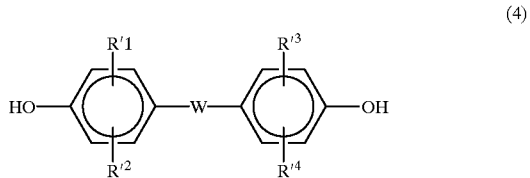

(4)

[in the formula, $R'^1$, $R'^2$, $R'^3$ and $R'^4$ are each independently H, a $C_{1\ to\ 12}$ alkyl, aralkyl or aryl group, a halogen; W is a $C_{1\ to\ 30}$ alkylidene, alkylene, cycloalkylidene, cycloalkylene or phenyl-substituted alkylene group, an oxygen atom, a sulfur atom, a sulfoxide group, a sulfone group, or a direct bond].

Concrete example of the aromatic dihydroxy compound include bis(4-hydroxyaryl)alkanes such as bis(4-hydroxyphenyl)methane, 2,2-bis(4-hydroxyphenyl)propane, 1,1-bis(4-hydroxyphenyl)ethane, 2,2-bis(4-hydroxy-3-methylphenyl)propane, 2,2-bis(4-hydroxyphenyl)heptane, 2,2-bis(4-hydroxy-3,5-dichlorophenyl)propane, 2,2-bis(4-hydroxy-3,5-dibromophenyl)propane, bis(4-hydroxyphenyl)phenylmethane, 4,4-dihydroxyphenyl-1,1-m-diisopropylbenzene, and 4,4-dihydroxyphenyl-9,9-fluorene, bis(hydroxyaryl)cycloalkanes such as 1,1-bis(4-hydroxyphenyl)cyclopentane, 1,1-bis(4-hydroxyphenyl)cyclohexane, 1-methyl-1-(4-hydroxyphenyl)-4-(dimethyl-4-hydroxyphenyl)methylcyclohexane, 4-{1-[3-(4-hydroxyphenyl)-4-methylcyclohexyl]-1-methylethyl}phenol, 4,4-[1-methyl-4-(1-methylethyl)-1,3-cyclohexanediyl]bisphenol and 2,2,2,2-tetrahydro-3,3,3,3-tetramethyl-1,1-spirobis-[1H]-indene]-6,6-diol, dihydroxydiaryl ethers such as bis(4-hydroxyphenyl) ether, bis(4-hydroxy-3,5-dichlorophenyl) ether and 4,4-dihydroxy-3,3-dimethylphenyl ether, dihydroxydiaryl sulfides such as 4,4-dihydroxydiphenyl sulfide and 4,4-dihydroxy-3,3-dimethyldiphenyl sulfide, dihydroxydiaryl sulfoxides such as 4,4-dihydroxydiphenyl sulfoxide and 4,4-dihydroxy-3,3-dimethyldiphenyl sulfoxide, dihydroxydiaryl sulfones such as 4,4-dihydroxydiphenyl sulfone and 4,4-dihydroxy-3,3-dimethyldiphenyl sulfone, dihydroxydiarylisatins such as 4,4-dihydroxydiphenyl-3,3-isatin, dihydroxydiarylxanthenes such as 3,6-dihydroxy-9,9-dimethylxanthene, dihydroxybenzenes such as resorcin, 3-methylresorcin. 3-ethylresorcin, 3-butylresorcin, 3-t-butylresorcin, 3-phenylresorcin, 3-cumylresorcin, hydroquinone, 2-methylhydroquinone, 2-ethylhydroquinone, 2-butylhydroquinone, 2-t-butylhydroquinone, 2-phenylhydroquinone and 2-cumylhydroquinone, and dihydroxydiphenyls such as 4,4'-dihydroxydiphenyl and 3,3'-dichloro-4,4'-dihydroxydiphenyl.

Especially, 2,2-bis(4-hydroxyphenyl)propane is preferable in that it is stable as a monomer and easily available in a state in which the quantity of impurities is little.

The aromatic dihydroxy compound of the present invention can be used singly or in combination.

Concrete examples of the aromatic ester bond forming precursor include aromatic dicarboxylic acids such as terephthalic acid, isophthalic acid, orthophthalic acid, naphthalenedicarboxylic acid and biphenylenedicarboxylic acid, aromatic dicarboxylic acid diaryl esters such as terephthalic acid diphenyl ester, isophthalic acid diphenyl ester, naphthalenedicarboxylic acid diphenyl ester, biphenylenedicarboxylic acid diphenyl ester, terephthalic acid bis(m-methylphenyl) ester, terephthalic acid bis(p-butylphenyl) ester and isophthalic acid bis(p-methylphenyl) ester, aromatic hydroxycarboxylic acids such as p-hydroxybenzoic acid and hydroxynaphthoic acid, aromatic hydroxycarboxylic acid aryl esters such as p-hydroxybenzoic acid phenyl ester, acid halides such as terephthaloyl dichloride and isophthaloyl dichloride, diaryl carbonates such as diphenyl carbonate, di-p-toluyl carbonate, dinaphthyl carbonate, di-p-chlorophenyl carbonate and phenyl p-toluyl carbonate, and phosgenes such as phosgene, phenyl chloroformate and 2,2-bis(4-hydroxyphenyl)propane bischloroformate.

When a polyarylate is produced by using an aromatic dicarboxylic acid and an aromatic dihydroxy compound out of the above-mentioned compounds, a direct esterification method is used, and when a polyarylate is produced by using an aromatic dicarboxylic acid diaryl ester and an aromatic dihydroxy compound, an ester interchange method is used; that is, in these cases, a melt-polycondensation method is preferably used.

Further, when a polycarbonate is produced by using an aromatic dicarboxylic acid, an aromatic dihydroxy compound and a diaryl carbonate, the diaryl carbonate works as a coupling agent for forming an ester bond, and a melt-polycondensation method is preferably used as the production method. In this case, when molar balances of every component to be charged are changed, the obtained polymer is a polyester carbonate having a carbonate bond in some case, and needless to say, the present invention contains this case.

When an aromatic dicarboxylic acid dihalide or a phosgene is used, polycondensation by an interfacial polymerization is preferred; however, for performing terminal modification described in the present invention, the reaction is preferably carried out in a molten state, and accordingly, the polymer obtained by the interfacial polymerization is preferably brought into a molten state before the terminal modification is carried out.

Out of these ester bond forming precursors, terephthalic acid diphenyl ester or isophthalic acid diphenyl ester is preferably used. Further, a method in which terephthalic acid or isophthalic acid is made to react with diphenyl carbonate to obtain the corresponding diphenyl ester is preferably used. In this case, carbon dioxide is formed as byproduct.

The reactivities of specific salicylic acid ester compounds disclosed in the present invention depend on the activity of the catalyst contained in the polymer in molten state or added to the polymer.

Concretely, as the catalyst used in the melt polycondensation and/or the terminal modification reaction, at least one compound selected from the group consisting of all combinations of alkali metal compounds, nitrogen-containing basic compounds, compounds of a metal element of the group 3, 14 or 15 in the periodic table is preferable.

Herein, a concrete example of the alkali metal compound is an alkali metal, or its hydroxide, alcoholate or phenolate, or organic or inorganic acid salt.

It is, for example, sodium hydroxide, potassium hydroxide, lithium hydroxide, sodium hydrogencarbonate, potassium hydrogencarbonate, lithium hydrogencarbonate, sodium carbonate, potassium carbonate, lithium carbonate, sodium acetate, potassium acetate, lithium acetate, sodium nitrate, potassium nitrate, lithium nitrate, sodium nitrite, potassium nitrite, lithium nitrite, sodium sulfite, potassium sulfite, lithium sulfite, sodium cyanate, potassium cyanate, lithium cyanate, sodium thiocyanate, potassium thiocyanate, lithium thiocyanate, sodium stearate, potassium stearate, lithium stearate, sodium borohydride, lithium borohydride, potassium borohydride, borosodium phenylide, sodium benzoate, potassium benzoate, lithium benzoate, disodium hydrogenphosphate, dipotassium hydrogenphosphate, dilithium hydrogenphosphate, a disodium, dipotassium or dilithium salt of bisphenol A, a sodium, potassium or lithium salt of phenol, or the like.

The use of the catalyst is in the range of $10^{-8}$ to $10^{-5}$ mol based on 1 mol of an aromatic hydroxy compound. When the use of the catalyst deviates from this range, the process has adverse influences on the properties of the obtained polymer, or the reaction does not proceed well; and unfavorably, there will be problems in which a polymer having high molecular weight is not obtained, or the like.

Examples of the nitrogen-containing basic compound include ammonium hydroxides having an alkyl, aryl or aralkyl group, or the like such as tetramethylammonium hydroxide, tetraethylammonium hydroxide, tetrabutylammonium hydroxide, benzyltrimethylammonium hydroxide and hexadecyltrimethylammonium hydroxide, tertiary amines such as triethylamine, tributylamine, dimethylbenzylamine and hexadecyldimethylamine, ammonium salts such as tetramethylammonium borohydride, tetrabutylammonium borohydride, tetrabutylammonium tetraphenyl borate and tetramethylammonium tetraphenyl borate, nitrogen-containing aromatic compounds such as pyridine, alkyl-substituted pyridines, bipyridine and N,N-dimethylaminopyridine, and cyclic amine compounds such as piperidine.

Among these compounds, tetramethylammonium hydroxide and N,N-dimethylaminopyridine are preferred.

The Use of the nitrogen-containing basic compound is $10^{-8}$ to $10^{-1}$ mol, preferably $10^{-7}$ to $10^{-2}$ mol, more preferably $1\times10^{-5}$ to $1\times10^{-3}$ mol based on 1 mol of an aromatic dihydroxy compound of a raw material in terms of an ammonium nitrogen atom.

These nitrogen-containing basic compound catalysts may be used singly or in combination.

Further, it is preferable that examples the nitrogen-containing basic compound include a compound expressed by the following formula (2),

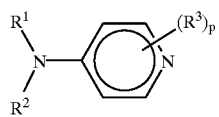
(2)

[in formula (2), $R^1$, $R^2$ and $R^3$ are identical to or different from each other, and H or a $C_{1 \, to \, 30}$ alkyl group; p is an integer of 1 to 4].

The compounds of a metal element of the group 3, 14 or 15 of the periodic table are concretely oxides, alkoxides or hydroxides of yttrium, lanthanum, cerium, germanium, tin or antimony. Their examples include metal oxides such as yttrium oxide, lanthanum oxide, cerium oxide, germanium oxide, tin oxide and antimony oxide, alkoxides such as yttrium ethoxide, lanthanum methoxide, lanthanum propoxide, germanium ethoxide, germanium butoxide, tin butoxide and antimony ethoxide, and hydroxides such as yttrium hydroxide, lanthanum hydroxide and cerium hydroxide.

These catalysts may be used in combination. In this case, the timing and method of addition may be changed in each catalyst depending on the purpose; for example, one catalyst is added at the start of polymerization and another catalyst is added in the middle of polymerization or in the terminal modification reaction.

Here, "terminal modification" means the reaction of a terminal modifying agent of the present invention with a polyarylate terminal group which will be defined later. Concretely, it includes blocking of a terminal group of a polyarylate by terminal blocking reaction, and increasing of polymerization degree through coupling of polyarylates to each other with polymerization acceleration reaction, as shown below.

The polymerization can be carried out under the same conditions as conventionally known common method.

When a polyarylate is obtained by a melt-polycondensation method of polymerization, specifically, the reaction of the first stage is carried out at 80 to 250° C., preferably 100 to 230° C., more preferably 120 to 190° C. for 0.5 to 5 hr, preferably 1 to 4 hr, more preferably 1.5 to 3 hr under reduced pressure. Subsequently, the reaction temperature is being elevated while the degree of vacuum is being increased, and finally the reaction is performed at a reduced pressure of 5 mmHg or lower, preferably 1 mmHg or lower.

The polycondensation may be carried out in a continuous operation or in a batch operation. There is no special limitation for a polymerizer used in the above-mentioned reaction, and a tank type, a tube type or a tower type can be used.

The terminal groups of a polyarylate produced by the above method commonly comprises three kinds of terminal groups of terminal carboxylic groups, terminal hydroxyl groups and aromatic ester terminal groups (in this description, it is referred as terminal phenyl group in some cases). In the present invention, the terminal carboxyl groups and the terminal hydroxyl groups out of them are each made to react with an above-mentioned specific salicylic acid ester compound to obtain the objective polymer excellent in hue and hue stability.

Further, also in a polymer to react with the salicylic acid ester compound, the contents of impurities such as chlorine and heavy metals are preferably suppressed to lower levels from the view point of the hue of the polymer to be obtained.

The molecular weight of the polymer is better if it is higher than a degree of molecular weight commonly referred as an oligomer; the intrinsic viscosity [η] measured in methylene chloride at 20° C. is preferably 0.2 or more, more preferably 0.3 or more for achieving the terminal modification effect.

Further, in a polymer before terminal modification, the ratios of the terminal groups can be controlled by the amount or method of charging or the like of the raw material. In the present invention, a polymer having the ratios of the terminal hydroxyl group and the terminal carboxyl group based on the total terminal groups of preferably 10 to 70% is subjected to terminal modification reaction. The molar number of the terminal hydroxyl groups or terminal carboxyl groups based on a certain amount of the polymer can be determined by a method such as 1H-NMR or carboxyl group titration.

The terminal modification reaction in the present invention can be classified into a terminal blocking reaction and a polymerization acceleration reaction depending the kind of the salicylic acid ester.

That is, in the above salicylic acid esters, when the $R^b$ is substituted with 2-(methoxycarbonyl) phenyloxycarbonyloxy, 2-(methoxycarbonyl) phenyloxycarbonyl, 2-(ethoxycarbonyl) phenyloxycarbonyloxy or 2-(ethoxycarbonyl) phenyloxycarbonyl, a polymerization acceleration reaction proceeds, and in the other cases, a terminal blocking reaction proceeds. The following shows the terminal blocking reaction and the polymerization acceleration reaction with reaction schemes.

A. Terminal Blocking Reaction

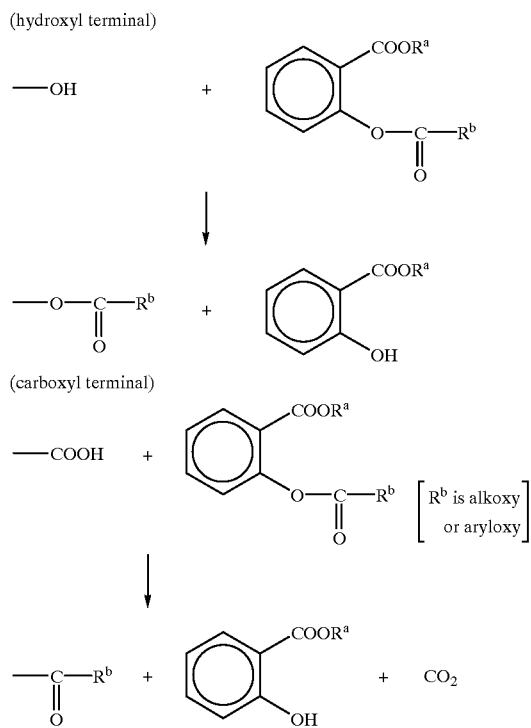

B. Polymerization Accelaration Reaction

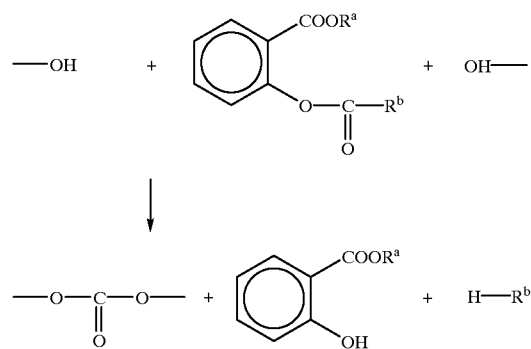

As to a method for adding the salicylic acid ester compound, there is no special limitation; it may be added in the as-solid state or after dissolved in a solvent various in kind. Further, when it is used as the terminal blocking agent, it may be added all in one time, or in several portions.

The amount of the addition of the salicylic acid ester as the terminal blocking agent is preferably 0.1 to 10 mole times, further preferably 0.3 to 5 mole times, further more preferably 0.5 to 2 mole times the total of the terminal carboxyl groups and hydroxyl groups of a polymer.

The pressure at which the terminal blocking agent is added in the present invention may be ordinal pressure or a reduced pressure.

In the present invention, the reaction temperature after the addition of the terminal blocking agent is commonly in the range of 250 to 360° C., preferably 260 to 340° C. If the temperature is lower than this range, the polymer does not melt, and if it is higher than the range, there is a possibility of the decomposition and coloration of the polymer.

The pressure after the addition of the terminal blocking agent may be ordinary pressure, but to remove the salicylic acid ester formed by the reaction, a reduced pressure is preferred. It is preferably 133.32 hPa (100 Torr) or less, further preferably 13.332 hPa (10 Torr) or less, further more preferably 1.3332 hPa (1 Torr) or less. The reaction time is usually for 1 to 30 min, preferably 1 to 20 min, and if desire, it may be 1 to 15 min.

Further, the polymerization acceleration reaction means the increasing of polymerization degree through coupling of terminal hydroxy groups of a polymer to each other or through coupling of a terminal hydroxyl group with a carboxyl group using the above salicylic acid ester compound. As to the method for adding the salicylic acid ester compound as the polymerization accelerating agent in the present invention, there is no special limitation; it may be added in the as-solid state or after dissolved in a solvent various in kind. Further, the specified amount of polymerization accelerating agent may be added at once or it may be added in several portions.

There is no special limitation regarding a feeding device by which the polymerization accelerating agent is supplied nor a reactor in which the polymerization accelerating reaction is carried out.

The amount of the addition of the salicylic acid ester as the polymerization accelerating agent in the present invention is 0.01 to 1 mole time, preferably 0.03 to 0.7 mole time, further preferably 0.05 to 0.5 mole time the total of the terminal carboxyl groups and hydroxyl groups of the polymer before the terminal modification.

The pressure at which the polymerization accelerating agent is added in the present invention may be ordinal pressure or a reduced pressure.

In the present invention, the reaction temperature after the addition of the polymerization accelerating agent is commonly in the range of 250 to 360° C., preferably 260 to 340° C. If the temperature is lower than this range, the polymer does not melt, and if it is higher than the range, the polymer decomposes and colors.

The pressure after the addition of the polymerization accelerating agent may be ordinary pressure, but to remove the phenol formed by the reaction, a reduced pressure is preferred. It is preferably 133.32 hPa (100 Torr) or less, further preferably 13.332 hPa (10 Torr) or less, further more preferably 1.3332 hPa (1 Torr) or less. The reaction time is usually for 1 to 30 min, preferably 1 to 20 min, and if desire, it may be 1 to 15 min.

In the present invention, a catalyst deactivator can be added to a polymer to which the terminal modification reaction has been applied. Any known catalyst deactivator can be used for this purpose; however, a salt of an organic sulfonic acid is preferable, and a quaternary salt of an organic sulfonic acid, for example, an ammonium salt or a phosphonium salt is especially preferable.

If such a quaternary ammonium salt of an organic sulfonic acid is used, hue and hue stability of the obtained polymer is especially excellent.

There is no special limitation on the method for adding the deactivator to the polymer after terminal modification. For example, it may be added while the polymer as a reaction product is still in a molten state, or it may be added after remelting of once pelletized polymer. In the former case, the deactivator may be added to the molten polymer obtained after the completion of the terminal modification reaction in a reactor, or to the molten polymer in a subsequent polymer tubing or extruder, and after the addition, the polymer may be pelletized or formed into another shape.

In the present invention, remaining phenols in a polymer after the terminal modification can be suppressed to a lower level. Here, the remaining phenols mean an aromatic hydroxy compound such as phenol derived from a carbonic acid diester of a raw material, and methyl salicylate or ethyl salicylate derived from a salicylic acid ester compound. The concentration of the remaining phenols is preferably 300 ppm or less, more preferably 200 ppm or less. If the amount of the remaining phenols is larger than 300 ppm, the lowering of molecular weight and coloring are apt to occur, and such an amount is not preferred.

Further in the present invention, it is preferred that at least one time or more out of before, in the middle of, or after the terminal modification, a stabilizer is added in a molten state. The stabilizer can be, for example, a sulfur-containing acidic compound and/or a derivative formed from the acidic compound, a phenolic stabilizer, a thioether type stabilizer, a phosphor-containing stabilizer, a hindered amine type stabilizer, an epoxy type stabilizer, a salicylic acid ultraviolet absorbent, a benzotriazole ultraviolet absorbent, or the like.

The stabilizer can be used singly or in combination.

To the polyarylate obtained by the present invention may be added a common heat stabilizer, ultraviolet absorbent, mold-releasing agent, coloring agent, antistatic agent, lubricant, anti-fogging agent, natural oil, synthetic oil, wax, organic filler or inorganic filler, or the like in the range where the object of the present invention is not damaged.

EXAMPLES

The present invention will be explained further in detail hereafter with examples.

The following are the examples of the present invention, and the present invention is not restricted by the examples.

Further, "part" in the following examples expresses "part by weight" unless otherwise specified.

In the present invention, measurements of physical properties are made by the following methods.

(i) Intrinsic Viscosity [η]

It was measured with an Ubbelohde viscometer in dichloromethane at 20° C.

(ii) Terminal Hydroxyl and Phenyl Group Concentrations

A sample (0.02 g) was dissolved in 0.4 ml of chloroform, and measured for terminal hydroxyl group and terminal phenyl group at 20° C. with a 1H-NMR (EX-270, manufactured by Nippon Denshi KK).

(iii) Terminal Carboxyl Group Concentration

A sample (0.1 g) was dissolved in 50 ml of a 20% dichloromethane/benzyl alcohol solution. The solution was titrated with a 0.001 N sodium hydroxide benzyl alcohol solution to determine the concentration of carboxyl group. Phenol red was used as an indicator.

Further, the concentrations of the terminal carboxyl group and hydroxyl group in a polymer were determined according to the following equations.

Terminal carboxyl group concentration (%)=(number of terminal carboxylic group/number of total terminal groups)×100

Terminal hydroxyl group concentration (%)=(number of terminal hydroxyl group/number of total terminal groups)×100

Herein, the number of total terminal groups is the total of the numbers of terminal phenyl group, terminal hydroxyl group and terminal carboxyl group determined above.

(iva) Hue of Polymer

L, a and b-values of a polycarbonate board 5 mm in thickness were measured by transmission method with a haze meter, Model ND-1001DP manufactured by Nippon Denshoku Kogyo K.K., and the b-value was used as the scale of yellowness.

(v) Hue Stability of Polymer

The test piece on which hue had been evaluated was held at 1 10° C. for 200 hr in air. The hue after holding was evaluated by measuring the L, a and b-values in the same manner as above, and the color stability was judged by using ΔE value calculated by the following equation. Here, ΔL, Δa and Δb are the values obtained by subtracting the L, a and b-values before holding from the L, a and b-values after holding at 110° C. for 200 hr in air, respectively.

$$\Delta E = \{(\Delta L)^2 + (\Delta a)^2 + (\Delta b)^2\}^{0.5}$$

Examples 1 and 3

A monomer and a catalyst of the kind and the amount shown in Table 1 were loaded into a reactor provided with a stirrer, a distiller and a pressure reducing device, and they were dissolved at 160° C. after the air was replaced with nitrogen.

After stirring for 30 min, the inside temperature was elevated to 180° C., and the reaction was carried out for 30 min under 100 mmHg and the formed phenol was distilled off.

Further, the pressure was slowly decreased with the temperature elevation to 200° C., and the reaction was continued for 30 min under 50 mmHg while removing phenol by distillation.

Further, temperature elevation and pressure reduction were performed slowly up to 230° C. and down to 30 mmHg, respectively, and the reaction was continued for 30 min at 230° C. and under 30 mmHg, and further for 30 min at 250° C. The temperature was elevated to 290° C. and the pressure was reduced to 1 mmHg or lower, and the reaction was continued. Then, at the stage where the intrinsic viscosity of polymer became about 0.40, a part of polymer was taken out.

Successively, a terminal modifying agent of the kind and the amount shown in Table 1 was added to the polymer in a molten state. Subsequently, the reaction was continued for 10 min at 290° C. and under 1 mmHg or lower to perform a terminal modification reaction. Then, a catalyst deactivator of the kind and the amount shown in Table 1 was added to the polymer in the as-molten state. Subsequently, the reaction was continued for 10 min at 290° C. under 10 mmHg or lower.

The obtained polymer was taken out, and tabular samples 5 mm in thickness were obtained. Hue, hue stability and the like of the obtained samples were evaluated. The results are shown in Table 1.

Examples 2 and 4

A monomer and a catalyst of the kind and the amount shown in Table 1 were loaded into a reactor provided with a stirrer, a distiller and a pressure reducing device, and they were stirred at 160° C. for 30 min after the air was replaced with nitrogen. The inner temperature was elevated to 180° C., and reaction was carried out for 90 min under 100 mmHg and the formed carbon dioxide and phenol were distilled off.

The subsequent operations (operations after the temperature elevation to 200° C.) were carried out in the same manner as in Example 1 except that a terminal modifying agent and a catalyst deactivator of the kind and the amount shown in Table 1 were each added. The obtained polymer was evaluated. The results are shown in Table 1.

Comparative Example 1

Operations were carried out in the same manner as in Example 1 except that no terminal modifying agent was used. The results are shown in Table 1.

TABLE 1

|  | C.Ex.1 | Ex.1 | Ex.2 | Ex.3 | Ex.4 |
|---|---|---|---|---|---|
| Monomer (part) | BPA 222 DPT 160 DPI 160 | BPA 222 DPT 160 DPI 160 | BPA 222 TPA 83 IPA 83 DPC 432 | BPA 222 DPT 160 DPI 160 | BPA 222 TPA 58 IPA 58 DPC 375 |
| Catalyst (part) | SP 0.001 NNDMAP 0.1 | SP 0.001 NNDMAP 0.1 | BPAS 0.001 NNDMAP 0.1 TMAA 0.01 | BPAS 0.001 NNDMAP 0.1 TMAH 0.01 | BPAS 0.001 NNDMAP 0.1 TMAH 0.01 |
| Terminal modifier (part) | none | 2MCPPC 5 | B2MCPC 3 | 2MCPpMB 5 | 2MCPPC 5 |
| De-activator (part) | TBADBS 0.01 | TBADBS 0.01 | TBPpTS 0.01 | TBADBS 0.01 | TBPpTS 0.01 |
| I.V. |  |  |  |  |  |
| before mod. | 0.400 | 0.402 | 0.398 | 0.412 | 0.412 |
| after mod. | 0.407 | 0.406 | 0.510 | 0.408 | 0.419 |
| Terminal COOH |  |  |  |  |  |
| before mod. | 3% | 3% | 17% | 5% | 8% |
| after mod. | 3% | 1% | 4% | 2% | 3% |
| Terminal OH |  |  |  |  |  |
| before mod. | 42% | 42% | 36% | 44% | 39% |
| after mod. | 40% | 8% | 6% | 9% | 6% |
| Hue (b-value) | 11 | 9 | 8 | 9 | 7 |
| Hue stability (ΔE) | 13 | 8 | 6 | 8 | 7 |

In Table 1, abbreviations are defined as follows.
C. Ex.: Comparative Example,
Ex.: Example,
BPA: bisphenol A,
DPT: diphenyl terephthalate,
DPI: diphenyl isophthalate,
TPA: terephthalic acid,
IPA: isophthalic acid,
DPC: diphenyl carbonate,
SP: sodium phenolate,
NNDMAP: N,N-dimethylaminopyridine,
BPAS: bisphenol-A sodium salt,
TMAA: tetramethylammonium acetate,
TMAH: tetramethylammonium hydroxide,
2MCPPC: 2-methoxycarbonylphenyl phenyl carbonate,
B2MCPC: bis(2-methoxycarbonylphenyl) carbonate,
2MCP$_p$MB: 2-methoxycarbonylphenyl p-methylbenzoate,
TBADBS: tetrabutylammonium dodecylbenzenesulfonate,
TBP$_p$TS: tetrabutylphosphonium p-toluenesulfonate
I.V.: intrinsic viscosity,
before mod.: before modification,
after mod.: after modification.

What is claimed is:

1. A process for producing a polyarylate through the polycondensation of an aromatic dihydroxy compound and an aromatic ester bond forming precursor, characterized in that terminal modification reaction is carried out by using a salicylic acid ester compound expressed by the following formula (1) as a terminal modifying agent,

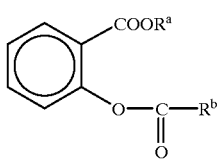

(1)

[wherein $R^a$ is ethyl or methyl; $R^b$ is a $C_{1\ to\ 30}$ alkyl group (hereinafter, $C_{x\ to\ y}$ means x to y of carbon number), $C_{1\ to\ 30}$ alkoxy group, a $C_{6\ to\ 30}$ aryl group or a $C_{6\ to\ 30}$ aryloxy group; $R^b$ is optionally substituted with methoxycarbonyl, ethoxycarbonyl, 2-(methoxycarbonyl)phenyloxycarbonyl, 2-(methoxycarbonyl)phenyloxycarbonyloxy, 2-(ethoxycarbonyl)phenyloxycarbonyl, 2-(ethoxycarbonyl)phenyloxycarbonyloxy, a $C_{1\ to\ 30}$ alkyl group, a C6 to 30 aryl group or a $C_{6\ to\ 30}$ aralkyl group].

2. A process for producing a polyarylate described in claim 1, characterized in that a catalyst is used in the polycondensation and/or the terminal modification reaction, and the catalyst is at least one compound selected from the group consisting of all combinations of alkali metal compounds, nitrogen-containing basic compounds, and compounds of a metal element of the group 3, 14 or 15 of the periodic table.

3. A process for producing a polyarylate described in claim 2, characterized in that the nitrogen-containing basic compound includes a compound expressed by the following formula (2),

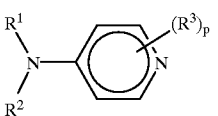

(2)

[wherein $R^1$, $R^2$ and $R^3$ are all same to or different from each other, and H or a $C_{1\ to\ 30}$ alkyl group; p is an integer of 1 to 4].

* * * * *